United States Patent
Pandey et al.

(10) Patent No.: US 11,551,681 B1
(45) Date of Patent: Jan. 10, 2023

(54) NATURAL LANGUAGE PROCESSING ROUTING

(71) Applicant: Amazon Technologies, Inc., Seattle, WA (US)

(72) Inventors: Rajesh Kumar Pandey, Bothell, WA (US); Ruhi Sarikaya, Kirkland, WA (US); Shubham Katiyar, Seattle, WA (US); Arun Kumar Thenappan, Seattle, WA (US); Isaac Joseph Madwed, Seattle, WA (US); Jihwan Lee, Kirkland, WA (US); David Thomas, Woodinville, WA (US); Julia Kennedy Nemer, Seattle, WA (US); Mohamed Farouk AbdelHady, Redmond, WA (US); Joe Pemberton, Seattle, WA (US); Young-Bum Kim, Kirkland, WA (US); Arima Vu Ram Thayumanavar, Seattle, WA (US); Wangyao Ge, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 171 days.

(21) Appl. No.: 16/714,108

(22) Filed: Dec. 13, 2019

(51) Int. Cl.
| | |
|---|---|
| G10L 15/22 | (2006.01) |
| G10L 15/06 | (2013.01) |
| G10L 15/18 | (2013.01) |
| G10L 15/183 | (2013.01) |
| G06F 16/245 | (2019.01) |
| G06N 20/00 | (2019.01) |
| G06F 16/22 | (2019.01) |

(52) U.S. Cl.
CPC ............. *G10L 15/22* (2013.01); *G06F 16/22* (2019.01); *G06F 16/245* (2019.01); *G06N 20/00* (2019.01); *G10L 15/063* (2013.01); *G10L 15/183* (2013.01); *G10L 15/1815* (2013.01); *G10L 2015/0635* (2013.01); *G10L 2015/0638* (2013.01); *G10L 2015/223* (2013.01)

(58) Field of Classification Search
CPC ... G10L 15/22; G10L 15/063; G10L 15/1815; G10L 15/183; G10L 2015/0635; G10L 2015/0638; G10L 2015/223; G06F 16/22; G06F 16/245; G06F 17/30389; G06N 20/00
See application file for complete search history.

(56) References Cited

U.S. PATENT DOCUMENTS 9,178,722 B1 * 11/2015 Gong .................. H04M 1/2535
10,027,662 B1 7/2018 Mutagi et al.
(Continued)

*Primary Examiner* — Michael Colucci
(74) *Attorney, Agent, or Firm* — K&L Gates LLP

(57) ABSTRACT

Devices and techniques are generally described for a speech processing routing architecture. In various examples, first data comprising a first feature definition is received. The first feature definition may include a first indication of first source data and first instructions for generating feature data using the first source data. In various examples, the feature data may be generated according to the first feature definition. In some examples, a speech processing system may receive a first request to process a first utterance. The feature data may be retrieved from a non-transitory computer-readable memory. The speech processing system may determine a first skill for processing the first utterance based at least in part on the feature data.

20 Claims, 9 Drawing Sheets

(56) References Cited

U.S. PATENT DOCUMENTS

| | | | |
|---|---|---|---|
| 11,238,673 B2* | 2/2022 | Honda | G07C 5/008 |
| 2004/0010697 A1 | 1/2004 | White | |
| 2010/0185447 A1* | 7/2010 | Krumel | G10L 15/32 |
| | | | 704/E15.041 |
| 2011/0066634 A1* | 3/2011 | Phillips | G10L 15/22 |
| | | | 707/769 |
| 2016/0104480 A1* | 4/2016 | Sharifi | G10L 15/22 |
| | | | 704/254 |
| 2016/0275139 A1* | 9/2016 | Gandhe | G06F 16/3323 |
| 2016/0314791 A1* | 10/2016 | Wang | G10L 15/22 |
| 2019/0141039 A1 | 5/2019 | Stoops et al. | |
| 2019/0188275 A1* | 6/2019 | Pan | G06F 16/9536 |
| 2019/0205386 A1 | 7/2019 | Kumar et al. | |
| 2020/0285813 A1 | 9/2020 | Singh et al. | |
| 2020/0357395 A1 | 11/2020 | Mirelmann | |
| 2020/0364512 A1 | 11/2020 | Lee et al. | |
| 2020/0380003 A1* | 12/2020 | Abbasi Moghaddam | |
| | | | H04M 1/72403 |
| 2021/0019375 A1 | 1/2021 | Croutwater et al. | |
| 2021/0089869 A1 | 3/2021 | Baughman et al. | |
| 2021/0210081 A1* | 7/2021 | Park | G10L 15/197 |

* cited by examiner

US 11,551,681 B1

NATURAL LANGUAGE PROCESSING ROUTING

BACKGROUND

Automatic speech recognition (ASR) combined with language processing techniques may enable a computing device to retrieve and process commands from a user based on the user's spoken commands. In some systems, speech recognition and/or voice-controlled devices activate upon detection of a spoken "wakeword." Natural language processing is used to translate the spoken requests into semantic interpretations of the spoken command. A speech processing application (e.g., a "skill") is selected for processing the spoken request. Executable instructions are generated based on the semantic interpretation of the spoken command. The executable instructions are executed by the skill and a corresponding task is performed. Such speech processing and voice control may be used by personal computers, hand-held devices, telephone computer systems, and a wide variety of other computing devices to improve human-computer interactions and to control various systems.

DETAILED DESCRIPTION

Figure 1:
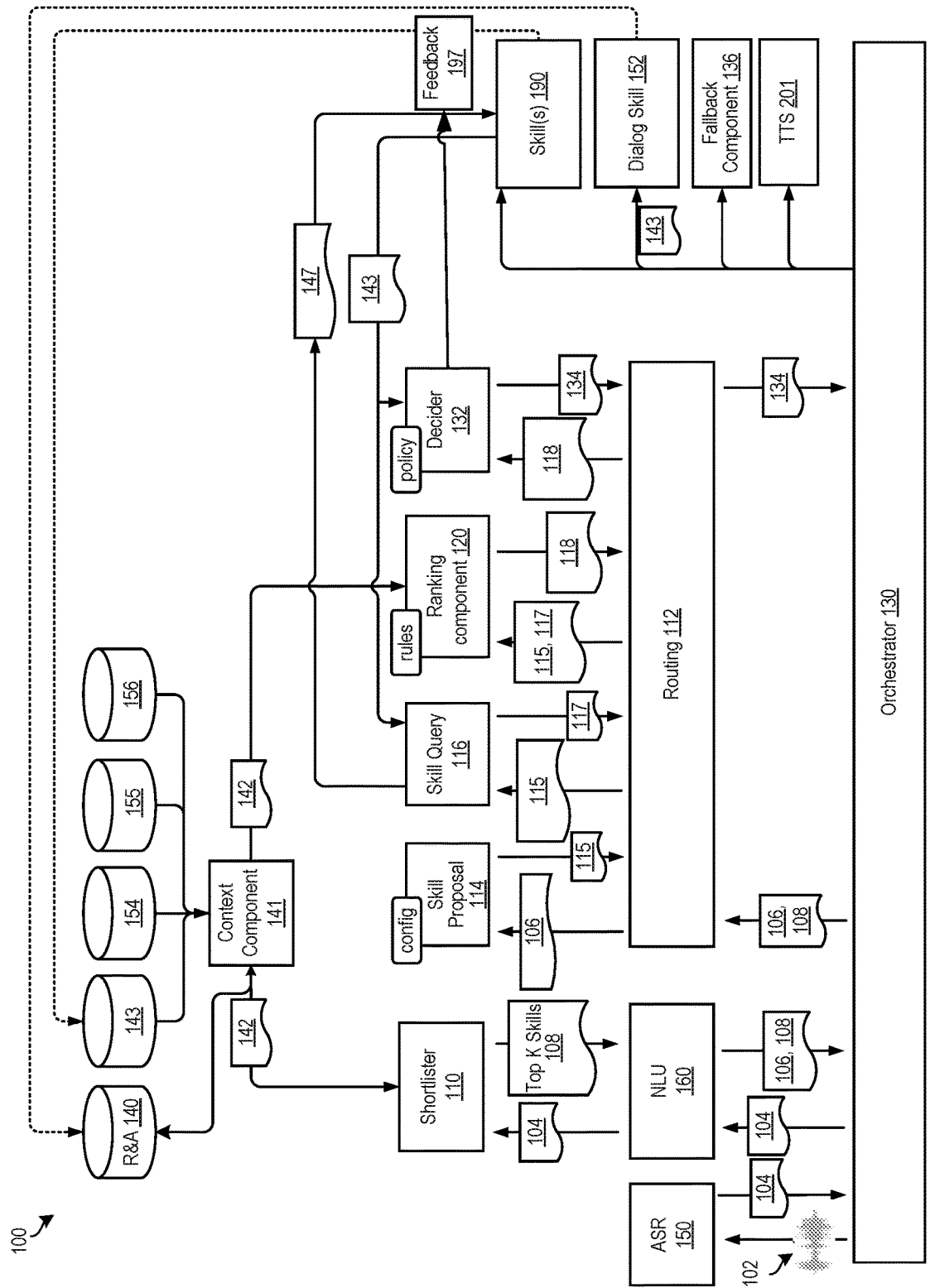
FIG. 1 is a block diagram illustrating an example speech processing routing architecture, according to various embodiments of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Automatic speech recognition (ASR) is a field of computer science, artificial intelligence, and linguistics concerned with transforming audio data associated with speech into text data representative of that speech. Natural language understanding (NLU) is a field of computer science, artificial intelligence, and linguistics concerned with enabling computers to derive meaning from text input containing natural language, resulting in specific executable commands or other type of instructions. Text-to-speech (TTS) is a field of computer science, artificial intelligence, and linguistics concerned with enabling computers to output synthesized speech. ASR, NLU, and TTS may be used together as part of a speech processing system.

Spoken language understanding (SLU) is a field of computer science, artificial intelligence, and/or linguistics that receives spoken language as an input, interprets the input, and generates executable commands that may be executed by one or more other computing devices and/or speech processing components. In various examples, spoken language understanding may be a combination of ASR systems and NLU systems, while in other examples, spoken language understanding may be a single model or other type of component effective to perform the functions of both ASR and NLU or otherwise take audio data as an input and output executable commands or other types of instructions representing the meaning of the audio data. In various further examples, SLU may include TTS where a machine learning model may receive input audio data (e.g., request data representing user request data and/or user text input data) and may generate output audio data in response to the utterance.

As used herein, user utterances, input text data, and/or any form of input data requests input to a speech processing system may be described by "request data" and/or "user request data." Such request data may change forms many times during processing of the request data by various components of the speech processing system, as described in further detail below. For example, initially the request data may be audio data and/or input text data representing a user question. The audio data may be transformed into text data by an ASR component of the speech processing system. The text data may be transformed into intent data by an NLU component of the speech processing system. The intent data may be used by a speech processing application (e.g., a skill) to perform an action (e.g., to generate action data that may be processed in order to take some corresponding action such as playing video and/or audio). "Request data" and/or "user request data" may refer to any data related to an input request to a speech processing system (e.g., including the various data forms described above, as each of the aforementioned data types relate to an input request to the speech processing system). In general, as used herein, speech processing applications may be any software (and/or combination of software and hardware) used during speech processing to take an action in response to input request data (e.g., natural language inputs such as user utterances and/or text). Speech processing application may process intent data representing the input request data. Such applications may include speech processing skills, speechlets, and/or other types of speech processing software.

In various examples, speech processing systems may determine an action to take for processing particular request data according to an interpretation of the natural language input (represented by the request data), as determined by NLU. For example, a particular speech processing application—sometimes referred to as a "skill" when the application is executed by a system located physically remote from the user's device or otherwise interfaces with a speech processing system—may be selected to process request data based on a determination that the request data pertains to the particular skill. For example, a speech processing application may be selected to process request data based on one or more intents and/or named entities determined during NLU processing of the request data. In another example, a speech processing system may determine an application that may generate a response to user request data that may be output via a TTS component of the speech processing system. Selection of the appropriate action and/or the appropriate speech processing component used to take the action and/or process the request data is non-trivial. Described herein is a speech processing routing architecture that may be used to dynamically determine the appropriate action and/or the appropriate speech processing component to process given request data. In various examples, the speech processing routing architecture may be used to determine routing destinations for request data and/or other natural language inputs for processing the inputs.

The speech processing routing architecture may facilitate the routing of request data to appropriate speech processing applications and/or other speech processing components. In various examples, the speech processing routing architecture may use machine learning models trained using features computed using user feedback data, context data, and/or other predictive signals in order to determine the appropriate speech processing application and/or other speech processing component to process request data. In various examples, using machine learning models to dynamically learn routing may improve the accuracy of the routing of speech processing requests, resulting in improved user experiences and/or more pertinent responses to user request data. For example, a machine learning system may dynamically learn from contextual data and/or user feedback data to provide routing exceptions and/or routing flexibility, in contrast to a deterministic routing system.

In an example embodiment, a ranking and arbitration component may receive a list of features that are used as inputs to various machine learning models of the speech processing system. Features may include vectors, tensors, and/or other structured data that may be used as an input to a machine learning model in order to generate a prediction (e.g., a speech processing routing prediction for request data). For example, the NLU system may use one or more machine learning models to determine a semantic interpretation of user request data. The NLU system may use various features as input. For example, the NLU system may use a feature representing text data representing an utterance, a feature representing context data describing a context of the utterance (e.g., geographic location of the device at which the utterance was received, time of day, device identifier, and so on), etc. In another example, the NLU system may use a feature representing user feedback data indicating user feedback related to similar request data. In various examples, at least some of the features used by the NLU system may be pre-computed prior to the processing of the request data, while other features used by the NLU system may be computing during request data processing, in an on-demand fashion. For example, the text data representing the utterance (e.g., the request data) may be computed in response to receipt of the request data (e.g., during processing of the request), while a feature indicating user feedback over the past 3 days for similar utterances may be pre-computed by the ranking and arbitration component prior to receipt of particular request data. Features that are pre-computed by the ranking and arbitration component may be defined and specified to the ranking and arbitration component prior to online processing of request data.

Accordingly, the ranking and arbitration component may generate pre-computed features according to definition data specified prior to online speech processing execution. The definition data may define features to be precomputed and may include identification of source data used to calculate the feature. Similarly, the definition data may include functions and/or formula used to calculate the features from the source data. In various examples, the feature definition data may be supplied to the ranking and arbitration component via an application programming interface (API). In other examples, speech processing components may determine the feature definition data and may send the feature definition data to the ranking and arbitration component. For example, a speech processing application shortlister component may specify a feature that is to be pre-computed and made available for use by one or more machine learning models of the speech processing application shortlister. The one or more machine learning models of the speech processing application shortlister may use the feature as an input, and may determine a subset of possible speech processing applications for processing given request data as an output. For example, the speech processing application shortlister may specify that user feedback data from the past day and context data from the past 2 hours are to be used to calculate the feature. The speech processing application shortlister may further define a manner in which the feature is to be calculated using the user feedback data and the context data. For example, the speech processing application shortlister may supply data representing a formula used to calculate the feature. The formula may use a numerical representation of the user feedback data and a numerical representation of the context data to generate a vector representation of the feature.

It should be appreciated that the foregoing example is illustrative only. In general, features may be pre-computed by the ranking and arbitration component for any machine learning models used by the speech processing system. The features may be pre-computed according to feature definitions supplied to the ranking and arbitration component prior to processing of request data (e.g., prior to runtime).

The ranking and arbitration component may store the various pre-computed features in one or more data structures in a non-transitory computer-readable memory accessible by the ranking and arbitration component. The ranking and arbitration component may generate one or more forward and/or inverted indexes that may be used to query the ranking and arbitration component for a particular pre-computed feature (e.g., by performing a lookup operation). Accordingly, during online request data processing, any speech processing component may query the ranking and arbitration component (e.g., through an API) in order to retrieve the pertinent feature(s) for the machine learning models employed by that speech processing component.

The ranking and arbitration component may communicate with one or more data sources to obtain the data used to compute the features according to the feature definitions. For example, the ranking and arbitration component may communicate with a context system that provides context data related to past speech processing interactions (e.g., location data, device identifier data, timing data, user account data, etc.). In another example, the ranking and arbitration component may communicate with a user feedback component that provides indications of past implied and/or explicit user feedback resulting from past user interactions with the speech processing systems (e.g., based on a past experience with a speech processing application). In another example, the ranking and arbitration component may communicate with a service that provides speech processing application data related to past processing of request data by a particular speech processing application (e.g., whether or not a skill was able to successfully process past request data, etc.). In general, the ranking and arbitration component may be configured in communication with any applicable data source that may be used to precompute features for machine learning models of the speech processing system.

Additionally, in some embodiments described herein, a dynamic routing adjustment component may provide for routing exceptions to accommodate newly-instantiated speech processing services. For example, if machine learning models are used to control routing decisions within a speech processing system, the machine learning models may not route request data traffic to a newly-instantiated speech processing service as there is no historical training data tending to indicate that such a new service is appropriate for processing an incoming request/utterance. Accordingly, a dynamic routing adjustment component may comprise an interface (e.g., an API) that allows new services to be defined within the speech processing system and that allows some speech processing traffic (e.g., user request data) to be diverted from their model-predicted speech processing path to the new service. Over time, the typical feedback data (e.g., context data, user feedback data, etc.) may be determined resulting from the use of the new service. The feedback data may, in turn, be used as training data to update the various machine learning models controlling routing of speech processing request data/requests. Accordingly, over time the machine learning models may learn what types of traffic should be routed to the new speech processing service and the routing exception provided by the dynamic routing adjustment component may be removed.

In some examples, the dynamic routing adjustment component may receive predicate data that defines the types of incoming traffic that is to be diverted to the new service. In addition, the dynamic routing adjustment component may receive an indication of the action(s) provided by the new service. Thereafter, the dynamic routing adjustment component may send at least some incoming requests/request data that satisfy the predicate data to the new service. For example, a percentage of the traffic satisfying the predicate data may be sent to the new service. In at least some examples, the percentage may be configurable. Further, in an example embodiment, prior to performing routing adjustment to accommodate a new service, the dynamic routing adjustment component may test the routing adjustment using historical data to ensure that the amount of traffic diverted from legacy services to the new service is acceptable.

In some embodiments described herein, a ranking component may generate a ranked list including an identification of a ranked subset of speech processing applications to which to route user request data for processing. In various examples, the ranking component may rank the speech processing applications output by the shortlister component (described above) in descending order of confidence scores, with the top result (e.g., the highest-ranked and/or scored speech processing application) being the speech processing application that has been determined by the models of the ranking component as being the most appropriate speech processing application for processing the current request data. In various examples, a decider component may act as a check on the results of the ranker component. For example, there may be scenarios in which statistical models of the ranking component may determine that a request should be routed to a particular speech processing application to perform a particular action. However, there may be risks associated with performance of the action or with routing the request data to the speech processing application for processing. For example, a user may say the phrase "Call 911." The ranking component may determine that the top-ranked result is a movie playing speech processing application that is effective to process the request data to play a movie entitled "Call 911." However, if the user intends for the speech processing system to call for an emergency service, the statistical result of the ranking component may not be the intended action and, in the current example, may be unsafe for the user.

Accordingly, the decider component may compare the results of the ranking component to one or more predefined policies that may indicate whether or not request data should be sent to top-ranked result of the ranking component or whether some other action should be taken. For example, if the phrase "Alexa, stop" is interpreted by ASR/NLU as the current utterance, the decider component may comprise a policy indicating that the ranking component results should be ignored and that the utterance should always cause the currently executing action to be terminated.

In another example, a decider component may determine a class of the request data. For example, if the request data is classified as belonging to a sensitive class the speech processing system may use TTS to confirm the user's intention prior to routing the request data to the top-ranked result of the ranking component. For example, a user request may be a request to "unlock the front door." The top-ranked result of the ranking component may be routing to a speech processing application that controls the lock on the front door. However, requests to unlock doors may be classified by the decider component as a sensitive request. Accordingly, the receipt of the sensitive request may trigger a confirmation request output by TTS prior to routing the utterance to the top-ranked speech processing application. For example, the confirmation request may be output as the audio representation of the text: "Did you want me to unlock the front door?"

In another example, the decider component may store policies that may control whether or not explicit user feedback is solicited (e.g., via a feedback request output via TTS) after the completion of an action (e.g., by the top-ranked speech processing application determined by the ranker component). In yet another example, a dynamic routing adjustment may send request data that matches predicate data defined using the dynamic routing adjustment component to a new speech processing application. The decider component may determine that the top ranked result from the ranking component should be ignored due to the dynamic routing adjustment being performed by the dynamic routing adjustment component. Additionally, in some examples, a policy of the decider component may be to solicit explicit feedback from the user whenever a new speech processing application is routed to due to a dynamic routing adjustment. Accordingly, at the completion of the action, the decider component may control TTS to inquire as to whether the user was satisfied with the interaction with the new speech processing application and/or whether the performed action was the action intended by the user.

Additionally, in some embodiments, the decider component may resolve ambiguity between two equally likely candidate speech processing applications (or candidate speech processing applications with similar likelihoods, such as when the ranking scores for candidate speech processing applications vary from one another by less than a threshold amount). The decider may disambiguate between the two candidate speech processing applications by asking a follow-up question (e.g., via TTS) to resolve the ambiguity. In some other examples, the ASR component may generate multiple hypotheses (e.g., multiple text hypotheses corresponding to a spoken user utterance). In some examples, the decider component may disambiguate between the two text hypotheses prior to making a routing decision via the ranker component. For example, ASR may determine a first hypothesis as "Call Ben," and a second hypothesis as "Call Jen." The decider component may ask a follow-up question (e.g., "Did you want to call Ben Smith?") to disambiguate prior to making a routing decision.

The decider component may comprise a memory effective to remember user choices resulting from disambiguation questions to avoid having to re-ask the same clarifying questions of the user multiple times, thereby potentially causing annoyance. Additionally, in some examples, the choice made by the user when presented with an clarifying question used to resolve ambiguity may be fed back into the ranking component machine learning models, so that the ranking component can learn to automatically resolve the ambiguity in the future, rather than relying on the decider component to ask the user clarifying questions. In various examples, a decay coefficient may be used so that the ambiguity is not resolved in favor of the user's choice in perpetuity, so that the user has an opportunity to later change their mind and have their utterance processed by a different speech processing application apart from the speech processing application learned by the ranking component as a result of the user's past choice.

Speech processing may be used in a variety of contexts, including in speech processing enabled devices (e.g., devices employing voice control and/or speech processing "voice assistants") and/or systems. Examples of speech processing systems and/or voice-enabled personal assistants include the Siri system from Apple Inc. of Cupertino, Calif., voice-enabled actions invoked by the Google Assistant system from Google LLC of Mountain View, Calif., Dragon speech recognition software from Nuance Communications of Burlington, Mass., the Cortana system from Microsoft of Redmond, Wash., the Alexa system from Amazon.com, Inc. of Seattle, Wash., etc.

Speech processing enabled devices may include one or more microphones (e.g., far-field microphone arrays) used to transform audio into electrical signals. Speech processing may then be performed, either locally by the speech processing enabled device, by one or more other computing devices communicating with the speech processing enabled device over a network, or by some combination of the speech processing enabled device and the one or more other computing devices. In various examples, speech processing enabled devices may include and/or may be configured in communication with speakers and/or displays effective to output information obtained in response to a user's spoken request or command, and/or to output content that may be of interest to one or more user's.

Storage and/or use of data related to a particular person or device (e.g., contextual data and/or any personal data) may be controlled by a user using privacy controls associated with a speech processing enabled device and/or a companion application associated with a speech processing enabled device. Accordingly, users may opt out of storage of personal and/or contextual data and/or may select particular types of personal and/or contextual data that may be stored while preventing aggregation and storage of other types of personal and/or contextual data. Additionally, aggregation, storage, and use of personal and/or contextual information, as described herein, may be compliant with privacy controls, even if not legally subject to them. For example, personal, contextual, and other data described herein may be treated as if it was subject to acts and regulations, such as the Health Insurance Portability and Accountability Act (HIPAA) and the General Data Protection Regulation (GDPR), even if it is not actually subject to these acts and regulations. In various examples, the data that may be used to optimize the machine learning techniques described herein may be used only in accordance with user permission, in compliance with any relevant laws and/or policies. Additionally, users may opt out of data collection, and/or may opt to delete some or all of the data used by the various techniques described herein, even where deletion or non-collection of various data may result in reduced functionality and/or performance of various aspects of the systems described herein.

A speech-controlled computing system may respond to user request data by outputting content and/or performing one or more other actions, such as initiating communications (e.g., synchronous phone/video calls and/or asynchronous messaging), playing music, providing information, calling a taxi, displaying an image, controlling other devices, etc. Generally, input data received by the various speech processing systems and components described herein may comprise natural language input data. Natural language input data may be in the form of audio data representing spoken user request data (e.g., a spoken user request), text data (e.g., a request typed by a user), gesture data (e.g., data representing a user shaking their head while wearing ear buds, making a hand gesture, etc.), and/or some combination of text data, gesture data, and/or audio data.

Speech processing systems may be configured with multiple applications (e.g., thousands, tens of thousands, or more applications) that can be used to potentially respond to a user request. Applications may be referred to herein as "speech processing applications". Natural language processing systems may be effective to process spoken and/or textual natural language inputs to determine data representing a semantic understanding of the inputs. Speech processing applications may include any application effective to receive inputs from a natural language processing system in order to take one or more actions based on those inputs. For example, a speech processing system may include music speech processing applications, video speech processing applications, calendar speech processing applications, timer speech processing applications, general knowledge answering speech processing applications, game speech processing applications, device control skills, etc. As described herein, speech processing applications receive NLU data comprising slot data and/or intent data and are configured to determine one or more actions based on the slot data and/or intent data. Examples of such actions may include text to be processed into output audio data (e.g., synthetic speech) via a text-to-speech (TTS) component, an executable command effective to play a song from a music service, a movie from a movie service, or the like, an executable command effective to cause a system to perform an action (e.g., turning lights on/off, controlling an appliance, purchasing an item, etc.).

The invocation of a speech processing application by a user's request may include a request that an action be taken. In at least some examples, a "skill," "skill component," "speech processing skill," and the like may be software running on a computing device, similar to a traditional software application running on a computing device. Such skills may include a voice user interface in addition to or instead of, in at least some instances, a graphical user interface, smart home device interface, and/or other type of interface.

As previously described, in at least some examples, a "skill," "skill component," and the like may be software that is run by a third party to the herein disclosed speech processing system (e.g., a 3P skill developer), without the third party provisioning or managing one or more servers for executing the skill. In such an implementation, the system may be triggered to run a skill in response to the third party calling the system via the Internet or a mobile application. Such implementation may include, but is not limited to, Amazon's AWS Lambda.

In various examples, a speech processing enabled device may include a wakeword detection component. The wakeword detection component may process audio data captured by microphones of the speech processing enabled device and may determine whether or not a keyword (e.g., a wakeword) is detected in the audio data. When a wakeword is detected, the speech processing enabled device may enter a "sending mode" in which audio detected by the microphones following the wakeword (e.g., data representing user request data spoken after the wakeword) may be sent to speech processing computing component(s) for further speech processing (e.g., ASR, NLU, etc.). In various examples, the wakeword detection component may be used to distinguish between audio that is intended for the speech processing system and audio that is not intended for the speech processing system.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result may determine the activation of a neuron in a subsequent layer. In addition, a bias value may be used to shift the output of the activation function to the left or right on the x-axis and thus may bias a neuron toward inactivation.

Generally, in machine learning models, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent algorithm (or gradient ascent algorithm) to incrementally adjust the weights to cause the most rapid decrease (or increase) to the output of the loss function. The method of updating the parameters of the machine learning model may be referred to as back propagation.

FIG. 1 is a block diagram illustrating an example speech processing system 100, according to various embodiments of the present disclosure.

In various examples below, skills may be referred to, however the techniques described herein with respect to skills are applicable to any speech processing applications. A system according to the present disclosure may operate using various components as described in FIG. 1. The various components illustrated FIG. 1 may be located on the same or different physical devices. Communication between various components illustrated in FIG. 1 may occur directly or across a network. A speech processing-enabled device may capture audio using an audio capture component, such as one or more microphone(s). The speech processing enabled device may send audio data 102 (e.g., corresponding to request data) to an orchestrator 130 of the speech processing system 100. The speech processing enabled device may also send metadata (e.g., including device identifiers, device type data, contextual data, IP address data, room location data, etc.) to the orchestrator 130. The components depicted in FIG. 1, including components of a speech processing system may be generally referred to as spoken language processing components, a speech processing system 100 a spoken language processing system, speech processing components, and/or a speech processing routing system. Additionally, in various examples, the components depicted in FIG. 1 may process written input (e.g., text data) in addition to spoken input.

Upon receipt by the speech processing system 100, the audio data 102 may be sent to an orchestrator 130. The orchestrator 130 may include memory and logic that enables the orchestrator 130 to initiate a dialog session and to transmit various pieces and forms of data to various components of the system, as described in further detail below.

The orchestrator 130 may send the audio data 102 to an ASR component 150 (e.g., a speech recognition component). The ASR component 150 may transcribe the audio data 102 into one or more hypotheses representing speech contained in the audio data 102. The ASR component 150 interprets the speech in the audio data based on a similarity between the characteristics of the audio data corresponding to the speech and pre-established language models. For example, the ASR component 150 may compare the audio data 102 with models for sounds (e.g., subword units such as phonemes) and sequences of sounds to identify words that match the sequence of sounds in the speech represented in the audio data 102. The ASR component 150 may send text data 104 and/or other ASR output data generated thereby to orchestrator 130 that may, in turn, send the text data 104 (and/or other ASR output data) to natural language component 160. As previously described, the text data 104 and/or other ASR output data may include one or more ASR hypotheses. The text data 104 and/or other ASR output data may include a top scoring hypothesis of the speech represented in the audio data 102 or may include an N-best list including a group of hypotheses of the speech represented in the audio data 102, and potentially respective scores ASR processing confidence scores. As previously described, in some other examples, the ASR component 150 (and/or other components of the speech processing system 100) may generate other metadata associated with the request such as an overall utterance confidence score, per-word (e.g., per token) confidence scores for the utterance, utterance duration, stream duration (e.g., duration of the stream of audio data from speech processing enabled device to speech processing system 100), a number of tokens output by ASR, etc.

The natural language component 160 attempts to make a semantic interpretation of the phrases or statements represented in the text data (and/or other ASR output data) input therein. That is, the natural language component 160 determines one or more meanings associated with the phrases or statements represented in the text data 104 and/or other ASR output data based on individual words represented in the text data 104 (and/or other ASR output data). The natural language component 160 interprets a text string to derive an intent of the user (e.g., an action that the user desires be performed) as well as pertinent pieces of information in the text data (and/or other ASR output data) that allow a device (e.g., the speech processing enabled device, the speech processing system 100, a computing device(s) implementing a speech processing application, etc.) to complete the intent. For example, if the text data 104 and/or other ASR output data corresponds to "Set temperature to 74 degrees," the natural language component 160 may determine the user intended to invoke a climate intent with a target temperature value slot of 74 degrees Fahrenheit. As previously described, in addition to the NLU intent and slot data, the natural language component 160 may generate other metadata associated with the request (e.g., with the audio data 102). Examples of such metadata include, an NLU confidence score for the top intent hypothesis, NLU classification type (e.g., statistical vs. deterministic), NLU slot presence (e.g., data indicating that a particular slot was present), NLU confidence score for the overall top hypothesis (e.g., including the relevant speech processing application, intent, and/or slot), entity recognition confidence scores, entity recognition match types (e.g., exact match, prefix match, suffix match, etc.), etc. Herein, the data output by the natural language component 160 (depicted in FIG. 1 as "NLU 160") is referred to as NLU output data 106.

Natural language component 160 may send the text data 104 (and/or other ASR output data) and/or some of NLU output data 106 (such as intents, recognized entity names, slot values, etc.) to a shortlister 110. The shortlister 110 may comprise one or more machine learning models that may be effective to predict a subset of speech processing applications that are most likely to be able to correctly process the request data, based on the input of the text data 104 (and/or other ASR output data) and/or the NLU output data 106. In addition, the shortlister 110 may call the ranking and arbitration component 140 to request features pre-computed by the ranking and arbitration component 140 according to features used as inputs by the machine learning models of shortlister 110. As previously described, the shortlister 110 may define source data used to compute the features and/or may specify functions used to generate the features from the source data (e.g., formulae and/or functions) prior to runtime processing of request data. The ranking and arbitration component 140 may precompute the features according to the specified feature definitions supplied by shortlister 110 and by the other components of speech processing system 100 and may store the precomputed features in memory. Ranking and arbitration component 140 may generate indexes that may be used to retrieve the precomputed features during runtime (e.g., through an API). Accordingly, during runtime processing, shortlister 110 may retrieve the precomputed features from ranking and arbitration component 140 used by shortlister 110 to generate the subset of speech processing applications that are most likely to be appropriate to process the current request data. Accordingly, shortlister 110 may send the top K skills 108 to natural language component 160. Natural language component 160 may thereafter perform skill-specific NLU processing for the skills in the top K skills 108 to determine skill-specific intents, slots, and/or named entities. NLU output data 106 may include such skill-specific data (e.g., skill-specific N-best hypotheses). In some examples, generating precomputed features based on user feedback data by ranking and arbitration component 140 may generate increasingly contextually rich feature data that may be used to train various machine learning models used to route speech processing request data (e.g., ranking component 120, shortlister 110, etc.).

Ranking and arbitration component 140 may communicate with various systems in order to obtain source data used to precompute features. In an example embodiment, ranking and arbitration component 140 may receive source data used to precompute features that is generated by other speech processing components (e.g., natural language component 160, ASR component 150, etc.). For example, NLU intent data may be used to pre-compute features for some downstream speech processing component (e.g., ranking component 120). Ranking component 120 may be "downstream" in the sense that processing by natural language component 160 occurs prior to processing by ranking component 120 during a given dialog session. In another example, ranking and arbitration component 140 may communicate with feedback storage 143 to receive user feedback data (e.g., explicit and/or implicit user feedback related to user satisfaction with processing of one or more request data) used as source data to precompute features. In various examples, the user feedback data may be user-specific and/or device specific and may indicate whether a user was satisfied or not satisfied with a particular interaction with speech processing system 100. Additionally, ranking and arbitration component 140 may communicate with endpoint context system 154, which may provide context data at the conclusion of a user interaction with the speech processing system 100. In another example, ranking and arbitration component 140 may communicate with speech processing application data 156 to determine information from the speech processing application regarding past interactions with the speech processing application and/or data acquired by the speech processing application. Additionally, ranking and arbitration component 140 may communicate with other data sources 155, as new services are added and/or as new data types that may be useful for routing prediction are made available. In addition to ranking and arbitration component 140 using context data 142 to precompute features used by various machine learning models of the routing architecture of the speech processing system 100, a context system 141 may receive the context data 142. The context system 141 may provide the context data directly to both ranking and arbitration component 140 as well as to various components of the routing architecture of speech processing system 100. For example, the context system 141 may send context data 142 to shortlister 110 and/or ranking component 120 in order to determine a shortlist of speech processing applications 190 for particular request data and/or in order to rank the shortlisted speech processing applications.

NLU output data 106 and top K speech processing applications 108 may be sent by natural language component 160 to orchestrator 130. Orchestrator 130 may send the top K speech processing applications 108 and the NLU output data 106 to routing component 112. Routing component 112 may send the top K speech processing applications 108 and NLU output data 106 to skill proposal component 114. Skills 190 may subscribe to particular intents using skill proposal component 114. Accordingly, skill proposal component 114 may receive the NLU output data 106 and may determine whether any of the included intents correspond to one or more of skills 190 that have registered for the particular intent. If so, skill proposal component 114 may generate candidate data comprising <Intent, Skill> candidate pairs 115. The candidate pairs 115 may be sent to routing component 112 and may be sent by routing component 112 to skill query service 116. Skill query service 116 comprises an API through which skills 190 may "opt out" of particular requests. For example, a skill 190 may comprise a video playback skill. Accordingly, the skill 190 may register with skill query service 116 to indicate that only requests made on a device with a display screen should be routed to the particular skill 190. In addition, skills 190 may communicate availability information, pricing information, and/or other structured descriptions of how and under what circumstances (e.g., determined using context data) the skill 190 can fulfill a request included in the current request data. Skill query service 116 provides a capability for speech processing applications (e.g., skills) to provide signals to ranking component 120 that indicate how well the particular speech processing application may handle the current request data. The ranking component 120 may use such input signals (e.g., signal 117) during ranking of the candidate pairs 115. Skill query service 116 may send a signal 117 indicating what skills can fulfill a particular request (and/or what skills are unable to fulfill the request), and/or how well the skill is able to fulfill the request. The signal 117 may be sent to routing component 112. Routing component 112 may send the signal 117 along with the candidate pairs 115 to a ranking component 120. As depicted in FIG. 1, skills 190 may send a signal 143 to skill query service 116 to indicate situations in which a skill may opt out of processing a particular request (e.g., if the device sending the request data does not include a display screen, etc.). In various examples, the signal 143 sent by skills 190 to skill query service 116 may be skill and/or request-specific. Additionally, skill query service 116 may send intent requests 147 to skills 190. Intent requests 147 may include the candidate pair 115 along with context data 142 and may be a request for an estimate of how well a speech processing application (e.g., a skill 190) may be able to handle the request. In response, the speech processing application may determine how well the skill may be able to process/fulfill the processing of the request data and may provide a signal to indicate how well the skill may be able to process/fulfill the request data to ranking component 120. For example, a particular skill may determine whether or not the intent included in the intent request 147 is an intent that the skill is effective to process and may provide signal 143 to ranking component indicating whether or not the skill is able to process the relevant intent. Ranking component 120 may, in turn, use the signal 143 as an input to one or more machine learning models used to rank the list of candidate pairs 115. In some examples, the signal 143 may also be sent to decider component 132 and decider component 132 may generate plan data 134 based at least in part on the signal 143.

For example, there may be low confidence in ASR output data comprising the text: "turn off timer." NLU may generate intent data comprising a "turn off timer" intent, with high confidence. Intent request 147, including the "turn off timer" intent, may be sent to a speech processing application controlling a timer. The speech processing application may send signal 143 to decider component 132 indicating that there is currently no timer set. Generally, a request to turn off a timer may be classified by decider component 132 as a sensitive class of request. Accordingly, as described below in reference to FIG. 7, the decider component 132 may generally request user confirmation before performing an action corresponding to a sensitive class of request. However, in the current example, the decider component 132 may not prompt the user for confirmation that the user intended to turn the timer off, as the signal 143 sent by the speech processing application in response to the intent request 147 has indicated that no timer is currently set. Accordingly, the decider component 132 may use such signals to determine plan data 134.

Further, in some examples, when it is ambiguous how to route a particular instance of request data, decider component 132 and/or ranking component 120 may seek to disambiguate the user's intention using a prompt that is output by TTS. The language used for the prompt to disambiguate may be generated by a speech processing application in response to an intent request 147 and sent as signal 143. As depicted in FIG. 1, the signal 143 may be sent to dialog skill 152 and may be used to output the prompt (e.g., via TTS).

Ranking component 120 may include one or more statistical machine learning models effective to rank the candidates included in candidate pairs 115. In order to rank the candidate pairs 115, ranking component 120 may generate confidence scores for each corresponding candidate pairs 115. A confidence score may indicate that the corresponding skill 190 and/or intent of the candidate pair is appropriate to process the request. Ranking component 120 may compute features using the candidate pairs 115 and signal 117 in order to predict the ranking of the skills 190 included in the candidate pairs 115. The features computing during processing of the request data (sometimes referred to as "runtime features") may comprise a feature representation of the list of candidate pairs 115 and/or a representation of the signal 117. Additionally, ranking component 120 may query ranking and arbitration component 140 for precomputed features that have been defined for use by ranking component 120. As previously described, the precomputed features may be determined based on contextual data, user feedback data, past usage data, skill data, previous rankings of ranking component 120, etc. Additionally, ranking component 120 may compute runtime features using context data 142, user feedback data from feedback storage 143, and/or other data sources. In various examples, the loss function for the machine learning models of ranking component 120 may optimize based on user satisfaction scores computed using user feedback data from feedback storage 143.

Ranking component 120 may generate a ranked list 118 of the candidate skills indicated in candidate pairs 115. In at least some examples, the ranking component 120 may use a deep neural network as a machine learning model for determining the ranked list 118. In addition, ranking component 120 (and/or some other speech processing system 100 component, such as decider component 132) may determine one or more rules that may override the ranked list 118 such that a lower ranked skill and/or a skill that is not one of the candidate pairs 115 is selected for processing the request data. For example, a dynamic routing adjustment may be inserted in order to emphasize a newly-implemented skill 190. The dynamic routing adjustment may divert some speech processing requests (e.g., a percentage of relevant request data) to the newly-implemented skill 190 in spite of the newly implemented skill 190 not being the top result (or potentially even among the results) of ranked list 118. Similarly, the newly-implemented skill 190 may be inserted among the top K skills 108 determined by the shortlister 110. Once a sufficient amount of user feedback for the newly-implemented skill 190 has been obtained, the dynamic routing adjustment may be removed. The machine learning models of the ranking component 120 and shortlister 110 may be retrained based on the newly-implemented skill and based on the user feedback the newly-implemented skill 190 has received as a consequence of the dynamic routing adjustment. Accordingly, thereafter the shortlister 110 may include the newly-implemented skill 190 in the top K skills 108 as appropriate for a given incoming request. Similarly, ranking component 120 may rank the newly implemented skill 190 as appropriate for processing the request.

In various examples, a decider component 132 may receive the ranked list 118 of candidates (including any candidates selected via a dynamic routing adjustment, as described above). In some examples, the decider component 132 may act as a check on the results of the ranking component. For example, there may be scenarios in which statistical models of the ranking component 120 may determine that a request should be routed to a particular skill to perform a particular action. However, there may be risks associated with performance of the action or with routing the request data to the skill for processing. For example, a user may say the phrase "turn on the oven." The ranking component may determine that the top-ranked result is a control skill that is effective to process the request data to turn on the oven. However, context data 142 may indicate that the user is not currently at home. Accordingly, turning on the oven may currently be unsafe, and the statistical result of the ranking component 120 may not be a safe or an intended result according to a particular policy. The policy may be a set of deterministic rules used to provide safety boundaries on sensitive requests.

Accordingly, the decider component 132 may compare the results of the ranking component 120 to one or more predefined policies that may indicate whether or not request data should be sent to top-ranked result of the ranking component 120 or whether some other action should be taken. For example, if the phrase "Arm the security system" is interpreted by ASR/NLU as the current utterance, the decider component may comprise a policy indicating that the ranking component results should be ignored and that the utterance should always be passed to a security system skill used to control security system hardware.

In another example, a decider component may determine a class of the utterance. For example, if the utterance is classified as belonging to a sensitive class the speech processing system may use a dialogue speech processing application and/or TTS to confirm the user's intention prior to routing the request data to the top-ranked result of the ranker component. For example, user request data may be a request to "unlock the front door." The top-ranked result of the ranking component may be routing to a skill that controls the lock on the front door. However, requests to unlock doors may be classified by the decider component 132 as a sensitive request. Accordingly, the receipt of the sensitive request may trigger a confirmation request output by TTS prior to routing the request data to the top-ranked skill. For example, the confirmation request may be "Did you want me to unlock the front door?"

In another example, the decider component 132 may store policies that may control whether or not explicit user feedback is solicited (e.g., via TTS) after the completion of an action (e.g., by the top-ranked skill determined by the ranker component). Explicit feedback may be solicited through the dialog skill 152 prior to routing request data to a skill for processing. In another example, decider component 132 may control feedback component 197 to request explicit feedback from a user post-skill processing (e.g., via TTS). In various examples, feedback component 197 may ask the user whether or not the user was satisfied with the action taken by the speech processing system 100. In yet another example, a dynamic routing adjustment may send request data that matches predicate data defined using the dynamic routing adjustment component to a newly-implemented skill 190. The decider component 132 may determine that the top ranked result from the ranking component 120 should be ignored due to the dynamic routing adjustment being performed by the dynamic routing adjustment component. Additionally, in some examples, a policy of the decider component 132 may be to solicit explicit feedback from the user whenever a new skill is routed to due to a dynamic routing adjustment. Accordingly, at the completion of the action, the decider component 132 may control TTS to inquire as to whether the user was satisfied with the interaction with the new skill and/or whether the performed action was the action intended by the user.

Decider component 132 may output plan data that comprises a routing plan 134 for processing the request data. The routing plan 134 may define a target skill 190 to process the request data. As described above, the target skill 190 may be selected as the top-ranked hypothesis determined by the ranking component 120. In some other examples, the decider component 132 may select a target skill 190 based on a policy and/or based on a class of the request data, as described above. In some examples, the ranking component 120 may determine that two different skills are equally applicable for processing the request data. In such examples, the decider component 132 may determine that disambiguation should occur. Accordingly, the routing plan 134 may include sending the request data to a dialog skill 152 that may output (via TTS) one or more questions (e.g., a disambiguation request) used to prompt the user to disambiguate between the two equally likely (or approximately equally likely) interpretations of the request data. For example, it may be unclear, based on a user's request, whether the user intended to invoke a movie playback skill or a music playback skill, as a movie and a soundtrack for the movie may be identified using the same name. Accordingly, the decider component 132 may determine that the top two hypotheses of ranking component 120 are equally likely (or approximately equally likely) and may determine that a question should be asked to disambiguate between the two possible actions. Accordingly, the routing plan 134 may route the request data to the dialog skill 152, and the dialog skill 152 may inquire whether the user intended to play the movie or the soundtrack.

In another example, the decider component 132 may determine that the user was not satisfied with the top hypothesis of the ranking component 120 (e.g., due to explicit or implicit feedback received from the user in response to taking an action associated with the top ranking component 120 hypothesis). Accordingly, the decider component 132 may determine that the routing plan 134 should be to determine the second highest ranked hypothesis of the ranking component 120. The routing plan 134 may be sent to the fallback component 136. In various examples, the fallback component 136 may determine a list of the top hypotheses, top intents, and/or top ASR text interpretations from the previous turn of dialog, and may select a fallback option for processing the request data from the lists.

The speech processing system 100 may also include a TTS component 201 that synthesizes speech (e.g., generates audio data) corresponding to text data input therein. Accordingly, one or more of skills 190, dialog skill 152, feedback component 136, ASR component 150, and/or orchestrator 130. The TTS component 201 may perform speech synthesis using one or more different methods. In one method of synthesis called unit selection, the TTS component 201 matches text data against one or more databases of recorded speech. Matching units are selected and concatenated together to form audio data. In another method of synthesis called parametric synthesis, the TTS component 201 varies parameters such as frequency, volume, and noise to create an artificial speech waveform output. Parametric synthesis uses a computerized voice generator, sometimes called a vocoder.

Figure 2:
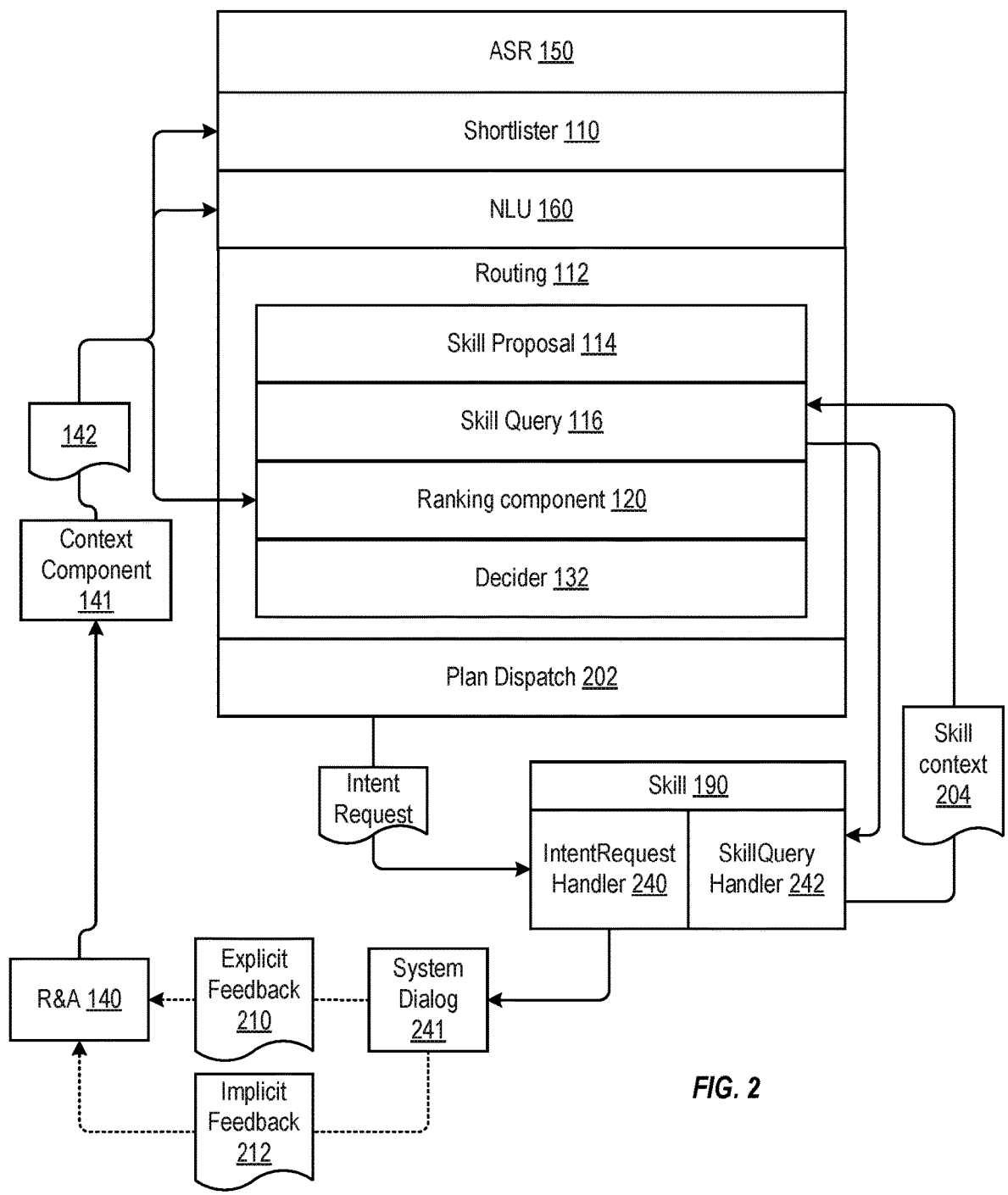
FIG. 2 is another block diagram illustrating an example speech processing flow for processing request data, according to various embodiments of the present disclosure.

FIG. 2 is another block diagram illustrating an example speech processing flow for processing request data, according to various embodiments of the present disclosure. FIG. 2 depicts the various components of the speech processing system 100 oriented in a stack. Request data processing generally proceeds from the top of the diagram to the bottom. For example, audio data representing request data may be received by ASR component 150. ASR component 150 may generate one or more text hypotheses representing the utterance/other natural language input. The ASR hypotheses may be sent to the shortlister 110 and/or the natural language component 160. In various examples, the shortlister 110 may be considered part of the natural language component 160. The shortlister 110 may determine a subset of skills that are most likely to be appropriate to process the current request data. Shortlister 110 may send the top K skills to natural language component 160. Natural language component 160 may thereafter perform skill-specific NLU processing for the skills in the top K skills 108 to determine skill-specific intents, slots, and/or named entities. NLU output data may include such skill-specific data (e.g., skill-specific N-best hypotheses). As previously described, in various examples, shortlister 110 and natural language component 160 may use pre-computed features determined by ranking and arbitration component 140 as well as context data 142 received from context system 141 in order to generate their respective outputs/predictions.

NLU output data and the top K skills may be sent to routing component 112. Routing component 112 may send the top K skills and NLU output data to skill proposal component 114. Skills 190 may subscribe to particular intents using skill proposal component 114. Accordingly, skill proposal component 114 may receive the NLU output data and may determine whether any of the included intents correspond to one or more of skills 190. If so, skill proposal component 114 may generate candidate data comprising <Intent, Skill> pairs. The candidate pairs may be sent to routing component 112 and may be sent by routing component 112 to skill query service 116. Skill query service 116 comprises an API through which skills 190 may "opt out" of particular requests. For example, a skill 190 may comprise a video playback skill. Accordingly, the skill 190 may register with skill query service 116 to indicate that only requests made on a device with a display screen should be routed to the particular skill 190. In addition, skills 190 may communicate availability information, pricing information, and/or other structured descriptions of how and under what circumstances (e.g., determined using context data) the skill 190 can fulfill a request included in the current request data. Skill query service 116 may send a signal indicating what skills can fulfill a particular request (and/or what skills are unable to fulfill the request). Routing component 112 may send the signal along with the candidate pairs to a ranking component 120. As depicted in FIG. 1, skills 190 may send skill context data 204 to skill query service 116 to indicate situations in which a skill may opt out of processing a particular request (e.g., if the device sending the request data does not include a display screen, etc.). In various examples, the skill context data 204 may be skill and/or request specific context data.

Ranking component 120 may receive the candidate pairs and may use context data 142 and/or precomputed features generated by ranking and arbitration component 140 to generate a ranked list of the candidate pairs. In various examples, a decider component 132 may receive the ranked list of candidates from the ranking component 120. Decider component 132 may determine whether or not there are any applicable policies to be applied based on the ranked list of candidates and/or based on the particular request. Decider component 132 may generate plan data and may send the plan data to a plan dispatch component 202 that may send an intent request to the appropriate skill 190.

The skill 190 may comprise an intent request handler 240 and/or a skill query handler 242. The intent request handler 240 may process the intent received from the routing component 112. Similarly, the skill query handler 242 may process the request data according to the particular service of the skill that has been requested.

In at least some examples, and in accordance with the plan data generated by decider component 132, a system dialog 241 may be initiated in order to solicit feedback from the user (e.g., after the skill 190 has completed processing the request data). In another example, the system dialog 241 may output a question used to disambiguate between different skills and/or intents. The system dialog 241 may receive the user's response and may generate explicit feedback 210 (e.g., where the user responds to a question asking whether the user was satisfied with the experience) and/or implicit feedback 212 (e.g., determining that the user interrupted playback/dialog in order to rephrase the request). As previously described, the implicit feedback 212 and/or explicit feedback 210 may be used by ranking and arbitration component 140 to generate precomputed features that may, in turn, be used by various machine learning models of the speech processing system 100.

Figure 3:
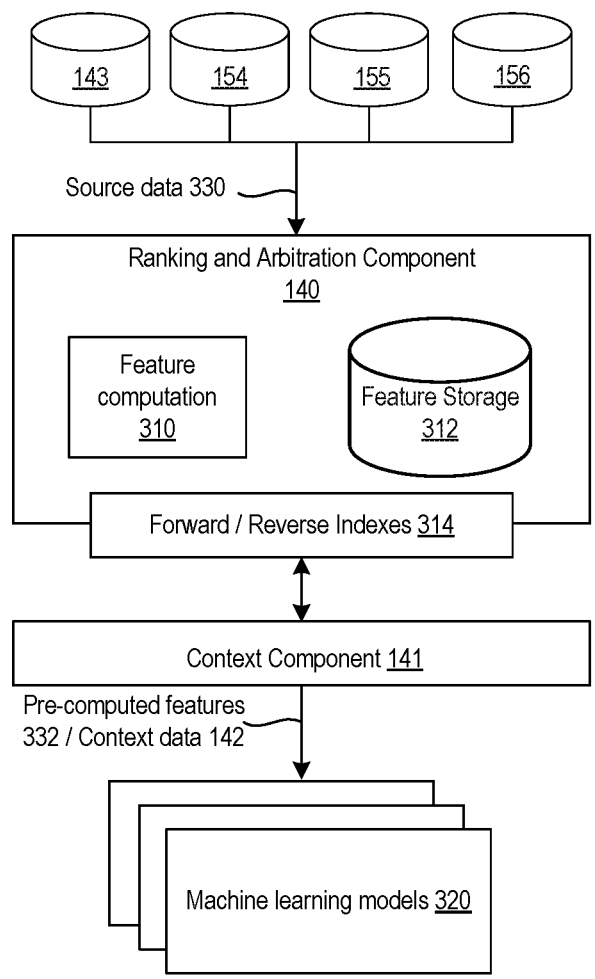
FIG. 3 is a block diagram describing a ranking and arbitration component, in accordance with various embodiments described herein.

FIG. 3 is a block diagram describing a ranking and arbitration component 140, in accordance with various embodiments described herein. Various downstream machine learning models 320 (e.g., machine learning models used by shortlister 110, ranking component 120, natural language component 160, etc.) may specify feature data used as inputs during prediction by the pertinent machine learning models 320 to ranking and arbitration component 140. For example, the downstream machine learning models 320 may specify source data 330 and functions used to compute the relevant features from the source data 330.

Ranking and arbitration component 140 may communicate with various data sources in order to retrieve the relevant source data 330 for feature computation. In some examples, ranking and arbitration component 140 may communicate with the various data sources on a repeating basis, so that the features computed by ranking and arbitration component 140 are computed based on the recent data. Data sources that may provide source data to ranking and arbitration component 140 may include feedback storage 143, endpoint context system 154, skill data 156, and/or other data sources. Feedback storage 143 may store implicit and/or explicit user feedback scores—e.g., values indicating user feedback for particular intents and/or skills used to process request data. For example, a particular user may be asked (via TTS and/or dialog skill 152 (FIG. 1)) whether the user was satisfied with a particular action taken as a result of processing particular request data. The user may respond affirmatively. Accordingly, explicit feedback data indicating the particular request data, the particular intent and/or skill used to process the request data, context data (e.g., user ID, device ID, time of day, etc.), and/or a score indicating that the user was satisfied with the interaction may be stored in a data structure in feedback storage 143.

Ranking and arbitration component 140 may include a feature computation component 310 that may compute features for the downstream machine learning models 320 based on the source data 330 and/or functions specified by the downstream machine learning models 320. The features may be stored in feature storage 312, which may be a non-transitory computer-readable memory. Ranking and arbitration component 140 may generate one or more forward and/or inverted indexes 314 that may be used to query the pre-computed features stored in feature storage 312. Ranking and arbitration component 140 may expose the forward and/or inverted indexes 314 via an API to the context system 141 and/or to the machine learning models 320. In various examples, context system 141 may store the pre-computed features as contextual data, and/or may use features computed for the context system 141 in order to determine context data.

Pre-computed features 332 and/or context data 142 may be provided to downstream machine learning models 320 and may be used as inputs to machine learning models 320 during prediction. For example, the downstream machine learning models 320 may query ranking and arbitration component 140 via the forward and/or inverted indexes 314 in order to obtain pre-computed features 332. Similarly, the downstream machine learning models 320 may query context system 141 to determine relevant context data 142. In at least some examples, the context data 142 may be determined based at least in part on features determined by ranking and arbitration component 140.

Using ranking and arbitration component 140 to pre-compute features prior to model runtime may reduce latency—as such features are readily available and do not need to be calculated in an on-demand fashion.

Figure 4:
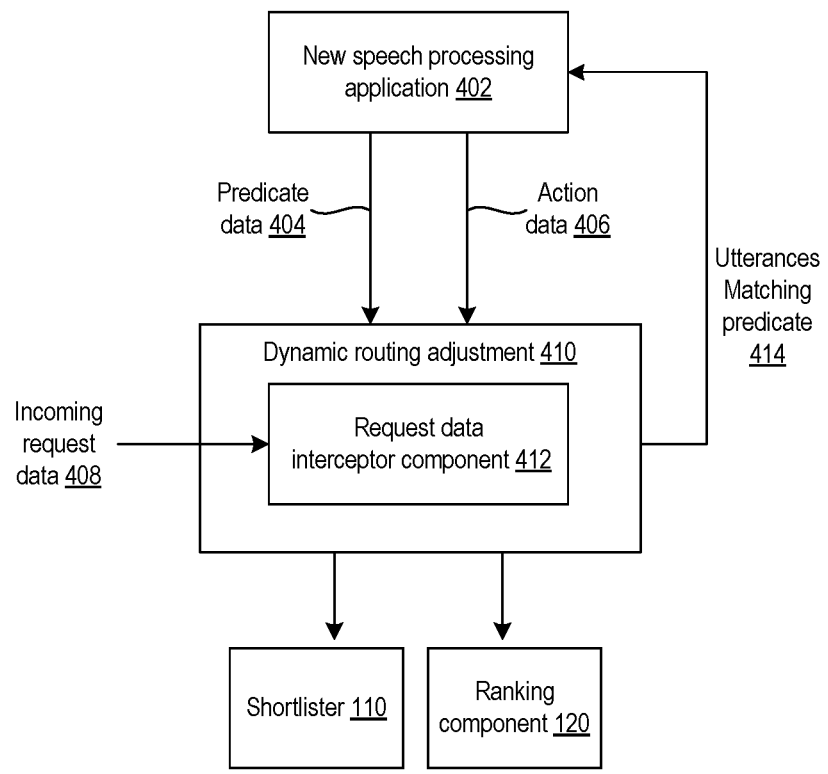
FIG. 4 is a block diagram illustrating an example dynamic routing adjustment for processing request data, in accordance with various embodiments described herein.

FIG. 4 is a block diagram illustrating an example dynamic routing adjustment for a new skill, in accordance with various embodiments described herein.

In the example depicted in FIG. 4, a new skill 402, may be a new skill that has been recently developed. In various examples, the new skill 402 may include one or more machine learning models that have not yet been trained using request data from users of speech processing system 100. New skill 402 may send predicate data 404 and action data 406 to a dynamic routing adjustment component 410. The predicate data 404 may define a class of request data that should be routed to a newly-implemented skill (e.g., the skill for which the dynamic routing adjustment has been instituted). The class of request data may be defined by characteristics of the request data that should be routed to dynamic routing adjustment component 410. For example, predicate data 404 may define a class of request data defined by particular slots, intents, context data, and/or named entities that should be present in request data in order for the request data to be routed to new skill 402. Action data 406 may define an action to be taken by new skill 402 (e.g., as a result of new skill 402 processing the request data).

After defining the predicate data 404 and the action data 406, dynamic routing adjustment component 410 may receive incoming request data 408, which may be any request data received by the speech processing system 100. The request data interceptor component 412 may determine whether or not an incoming utterance 408 corresponds to the predicate data 404. In other words, the request data interceptor component 412 may determine if an incoming utterance 408 comprises the characteristics defined by the predicate data 404. For example, if the predicate data 404 may specify request data that are received between 5:00 pm and 8:00 pm PT that are received on a device that includes a display screen and include a particular intent and/or named entity.

Request data that are deemed by request data interceptor component 412 to match the predicate data 404 (e.g., request data 414) are sent to new skill 402 for processing. Additionally, an override signal may be sent to ranking component 120, such that the new skill 402 is selected as the top ranked hypothesis of the ranking component 120. Alternatively, the override signal may cause the top ranked hypothesis of the ranking component 120 to be ignored by the decider component 132, and the request data may be instead routed to the new skill 402 for processing. Similarly, shortlister 110 may receive a signal from dynamic routing adjustment component 410 indicating that the new skill 402 should be among the shortlisted skills for request data matching the predicate data 404.

The new skill 402 may process the request data sent to it as a result of the dynamic routing adjustment. After processing, feedback data may be generated (e.g., implicit feedback and/or explicit feedback) from user interactions with speech processing system 100. The feedback data may be used to retrain machine learning models of new skill 402 as well as shortlister 110, ranking component 120, natural language component 160, etc. After the models have been retrained (e.g., after a day, a week, a month, and/or after the new skill 402 has processed a threshold number of request data), the dynamic routing adjustment may be removed. Thereafter, the new skill 402 may be shortlisted and/or ranked as described above in reference to FIG. 1 and request data traffic may be routed to the new skill by shortlister 110 and/or ranking component 140 as determined by the machine learning models of these systems. In other words, the dynamic routing adjustment may be used to temporarily route traffic to the new skill until the models have been updated to account for the new skill 402 and rank it and/or shortlist it, as appropriate. Additionally, the dynamic routing adjustment may be used to train the machine learning models of the new skill itself so that actions performed by the new skill 402 can be optimized.

In various other examples, the applicability of a dynamic routing adjustment 410 may extend beyond the implementation of new skills. For example, the dynamic routing adjustment 410 may be used to improve the routing of incoming request data traffic to any speech processing application. Incoming request data traffic may be sent to the speech processing application (e.g., a skill) according to the dynamic routing adjustment 410. User feedback may be determined and later the shortlister 110 and/or ranking component 120 may be updated based on the feedback data. The routing of request data traffic to the skill may be improved as a result.

Figure 5A:
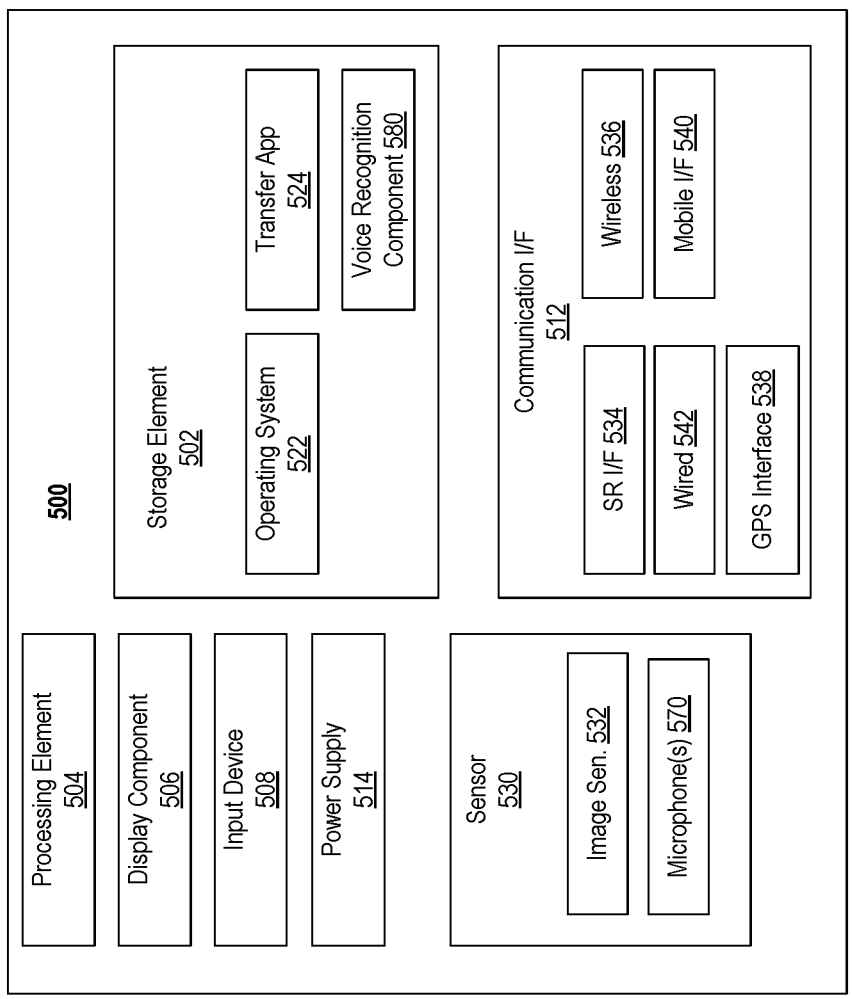
FIGS. 5A-5B are block diagrams showing example architectures of computing devices that may be used in accordance with various embodiments described herein.

FIG. 5A is a block diagram showing an example architecture 500 of a computing device that may be used to implement, at least in part, speech processing system 100, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). In some examples, the processing element 504 may be effective to determine a wakeword and/or to stream audio data to speech processing system 100. The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500. In some examples, the transfer application 524 may also be configured to send the received voice requests to one or more voice recognition servers (e.g., speech processing system 100).

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display content determined provided by a skill executed by the processing element 504 and/or by another computing device.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. Voice recognition component 580 may interpret audio signals of sound captured by microphone 570. In some examples, voice recognition component 580 may listen for a "wakeword" to be received by microphone 570. Upon receipt of the wakeword, voice recognition component 580 may stream audio to a voice recognition server for analysis, such as speech processing system 100. In various examples, voice recognition component 580 may stream audio to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as a computer communication network, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5A. An example of an image sensor 532 may be a camera configured to capture color information, image geometry information, and/or ambient light information.

Figure 5B:
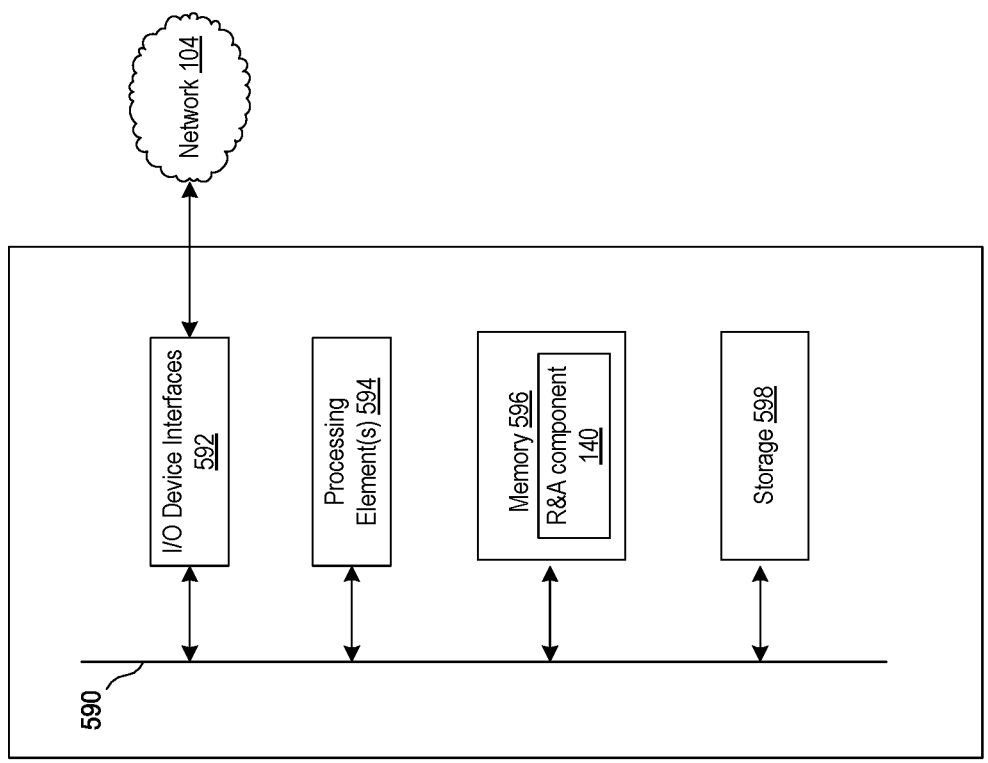

FIG. 5B is a block diagram conceptually illustrating example components of a remote device, such as a computing device executing a particular skill 190, a computing device executing one or more components of speech processing system 100 (e.g., the ranking and arbitration component 140, ASR processing components, NLU processing components, applicable protocol recognition, etc.) and/or command processing. Multiple computing devices may be included in the system, such as one speech processing computing device for performing ASR processing, one speech processing computing device for performing NLU processing, one or more skill computing device(s) implementing skills 190, etc. In operation, each of these devices (or groups of devices) may include non-transitory computer-readable and computer-executable instructions that reside on the respective device, as will be discussed further below.

Each computing device of speech processing system 100 may include one or more controllers/processors 594, which may each include at least one central processing unit (CPU) for processing data and computer-readable instructions, and a memory 596 for storing data and instructions of the respective device. In at least some examples, memory 596 may store, for example, a list of N-best intents data that may be generated for particular request data. In some examples, memory 596 may store machine learning models of the ranking component 120, skills 190, shortlister 110, etc., when loaded from storage 598. In various further examples, memory 596 may be effective to store instructions effective to program controllers/processors 594 to perform the various techniques described above in reference to ranking and arbitration component 140, decider component 132, and/or the dynamic routing adjustment described above in reference to FIGS. 1-4. Accordingly, in FIG. 5B, ranking and arbitration component 140 is depicted as being stored within memory 596, as an example. The memories 596 may individually include volatile random access memory (RAM), non-volatile read only memory (ROM), non-volatile magnetoresistive memory (MRAM), and/or other types of memory. Each computing device of speech processing system 100 may also include storage 598 for storing data and controller/processor-executable instructions. Each data storage component 598 may individually include one or more non-volatile storage types such as magnetic storage, optical storage, solid-state storage, etc. Each computing device of speech processing system 100 may also be connected to removable or external non-volatile memory and/or storage (such as a removable memory card, memory key drive, networked storage, etc.) through respective input/output device interfaces 592. In various examples, the feature data described above in reference to ranking and arbitration component 140, may be stored in memory 596 and/or storage 598.

Computer instructions for operating each computing device of speech processing system 100 may be executed by the respective device's controllers/processors 594, using the memory 596 as temporary "working" storage at runtime. A device's computer instructions may be stored in a non-transitory manner in non-volatile memory 596 (e.g., a non-transitory computer-readable memory), storage 598, or an external device(s). Alternatively, some or all of the executable instructions may be embedded in hardware or firmware on the respective device in addition to or instead of software.

Each computing device of speech processing system 100 includes input/output device interfaces 592. A variety of components may be connected through the input/output device interfaces 592, as will be discussed further below. Additionally, each computing device of speech processing system 100 may include an address/data bus 590 for conveying data among components of the respective device. Each component within a computing device of speech processing system 100 may also be directly connected to other components in addition to (or instead of) being connected to other components across the bus 590.

As noted above, multiple devices may be employed in a single system. In such a multi-device system, each of the devices may include different components for performing different aspects of the system's processing. The multiple devices may include overlapping components. The components of the speech processing system 100, as described herein, are exemplary, and may be located as a stand-alone device or may be included, in whole or in part, as a component of a larger device or system.

Figure 6:
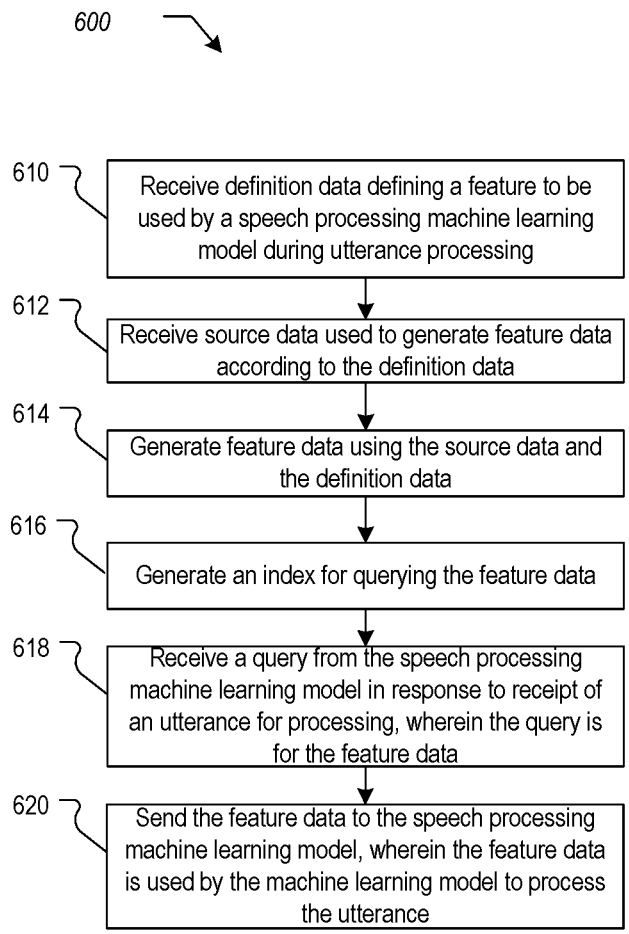
FIG. 6 depicts a flow chart showing an example process for generating pre-computed feature data used for request data processing in a speech processing system, in accordance with various aspects of the present disclosure.

FIG. 6 depicts a flow chart showing an example process 600 for generating pre-computed feature data used for request data processing in a speech processing system, in accordance with various aspects of the present disclosure. Those portions of FIG. 6 that have been previously discussed in reference to FIGS. 1-5B may not be described again for purposes of clarity and brevity. The actions of the process 600 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 600 may begin at action 610, at which definition data may be received by ranking and arbitration component 140. The definition data may comprise a feature definition that may be used by a particular machine learning model (e.g., a machine learning model of natural language component 160, shortlister 110, ranking component 120, etc.). In various examples, the feature definition may specify one or more functions that may be used to calculate the feature as well as source data that may be used as an input to the function used to calculate the feature. In some implementations, the feature definition may specify the source data which may, itself, be used as the feature. In other examples, one or more operations and/or calculations may be performed on the source data in order to transform the source data into a form (e.g., into an appropriate number of dimensions) that is useful for input into the relevant machine learning model.

Processing may continue from action 610 to action 612, at which the source data may be received by the ranking and arbitration component 140. In various examples, the source data defined by the definition data of action 610 may be used to query the appropriate data source to receive the source data specified by the definition data.

Processing may continue from action 612 to action 614, at which feature data may be generated using the source data and the definition data. In various examples, the source data may be used as an input argument into a function specified by the definition data. The function may output the feature data that may then be used as an input to the machine learning model of the speech processing component that supplied the definition data at action 610.

Processing may continue from action 614 to action 616, at which one or more indexes may be generated for querying the feature data. For example, a forward and/or inverted index may be generated for feature data computed by the ranking and arbitration component 140. For example, an inverted index may be used to search for multiple features pertaining to one machine learning model. A forward index may be used to search for particular features within a data structure that includes multiple features for the model (e.g., a data structured identified using the inverted index). The indexes may be exposed via an API so that client machine learning models may query the ranking and arbitration component 140 for pre-computed features.

Processing may continue from action 616 to action 618, at which a query may be received from the speech processing machine learning model in response to receipt of request data to be processed by the speech processing machine learning model. For example, ranking component 120 may receive a list of candidate pairs including a potential skill paired with an intent for the skill that may be used to process particular request data. Ranking component 120 may query ranking and arbitration component 140 for one or more precomputed features used by ranking component 120 to rank the various candidate pairs.

Processing may continue from action 618 to action 620, at which the feature data may be sent to the speech processing machine learning model. The speech processing machine learning model may use the feature data to process request data. In the example described above, the feature data may be used as an input to one or more machine learning models of the ranking component 120 in order to rank the various candidate pairs.

Figure 7:
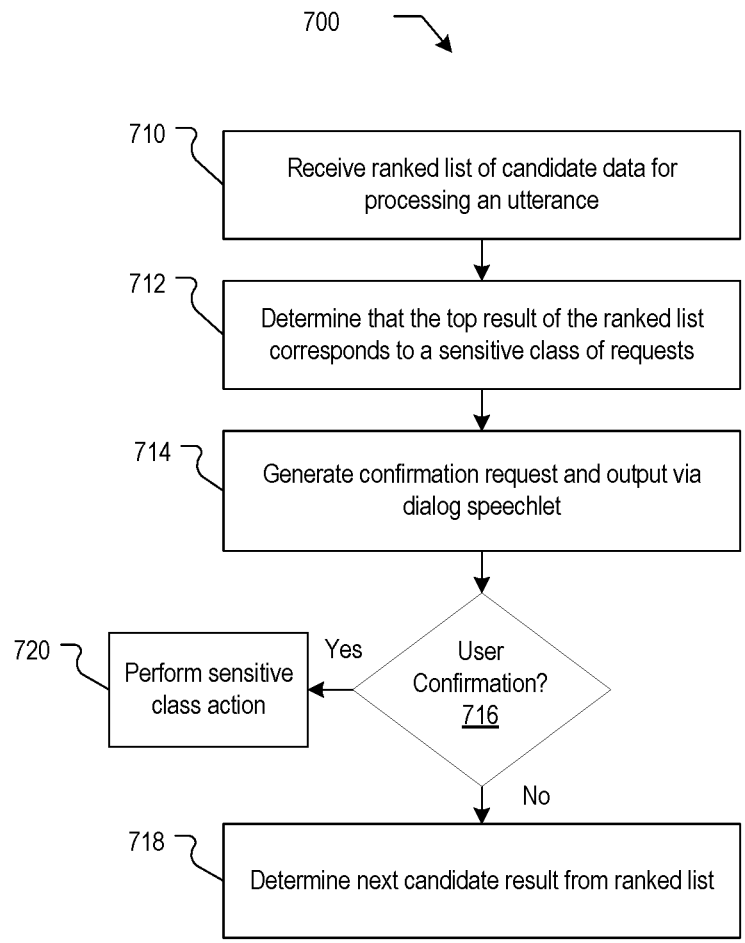
FIG. 7 depicts a flow chart showing an example process for processing a predefined class of request data, in accordance with various aspects of the present disclosure.

FIG. 7 depicts a flow chart showing an example process 700 for processing a predefined class of request data, in accordance with various aspects of the present disclosure. Those portions of FIG. 7 that have been previously discussed in reference to FIGS. 1-6 may not be described again for purposes of clarity and brevity. The actions of the process 700 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

In some examples, process 700 may begin at action 710, at which decider component 132 may receive a ranked list of candidate data (e.g., a ranked list of candidate pairs 115, with each pair including an identifier of a skill and an intent for that skill). The candidate data may be ranked according to confidence scores determined for each candidate pair by ranking component 120. Candidate data may represent candidate skills (and/or intents for each skill) that may be used to process current request data.

Processing may continue from action 710 to action 712, at which a determination may be made that the top result of the ranked list of candidate data corresponds to a sensitive class of skills and/or intents. Various skills and/or intents may be designated as a sensitive class using metadata associated with the skill. Examples of intents and/or skills that may be designated as a sensitive class may include intents and/or skills that may have safety, legal, and/or purchase ramifications. For example, an intent of a shopping skill that is used to purchase a product that is priced above a threshold amount, an intent and/or skill used to control potentially dangerous equipment, an intent and/or skill used to take an action that may contravene a particular law and/or regulation, etc.

Processing may continue from action 712 to action 714, at which a confirmation request may be generated and output via a dialog speech processing application (and/or TTS). The confirmation request may be a question asking a user whether or not the request corresponding to the sensitive class of requests was the user's intended request. At action 716, a determination may be made whether the user confirms that the sensitive request was intended. If so, at action 720, the sensitive class's action may be performed in accordance with the user confirming the request. If not, at action 718, the next candidate result from the ranked list may be determined. In various examples, the dialog speech processing application may be used to inquire whether the user intended the next candidate result (e.g., the second-to-highest ranked result from the ranking component 120) for processing the request data.

Figure 8:
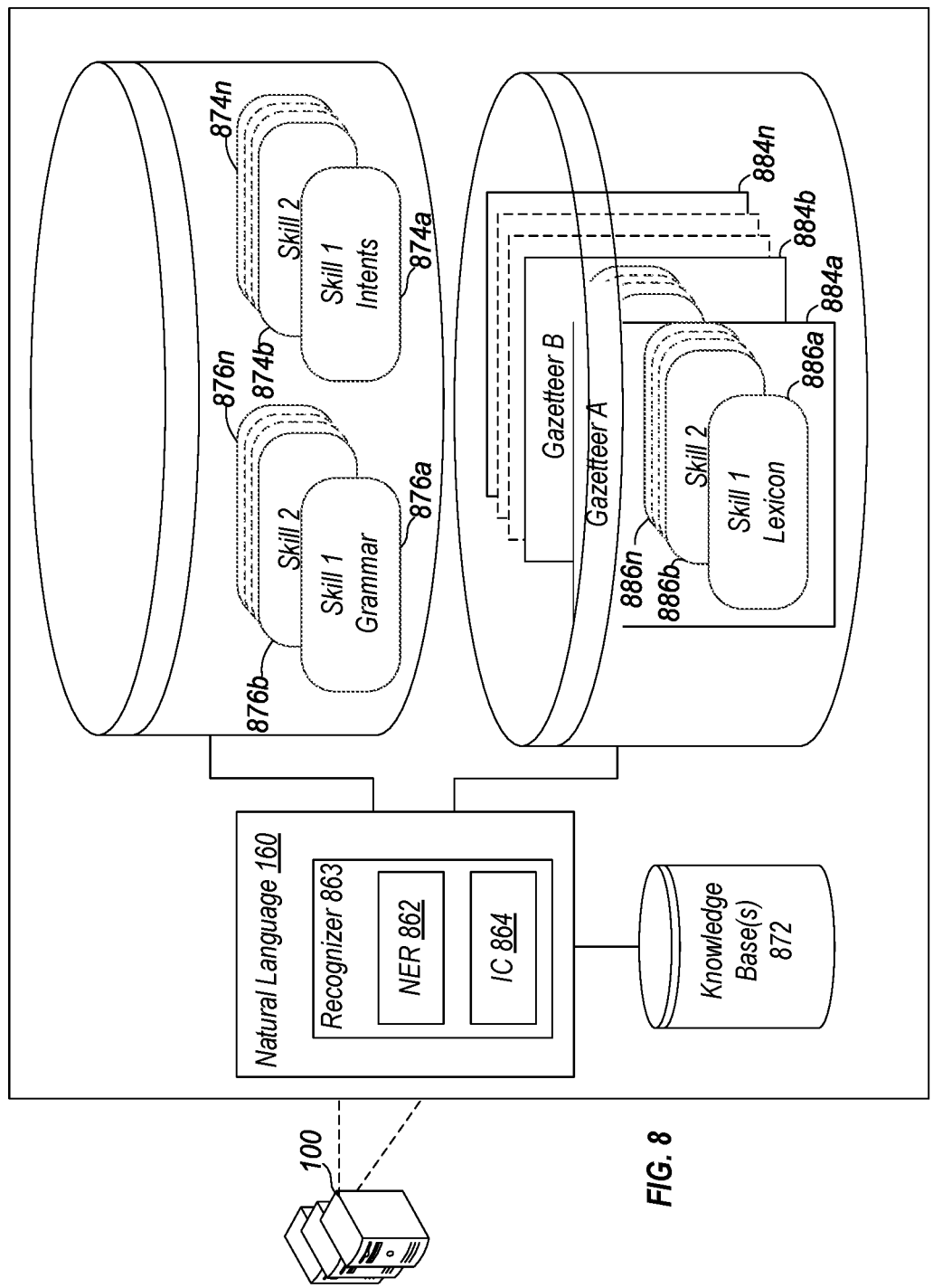
FIG. 8 is a conceptual diagram illustrating how natural language understanding processing is performed according to embodiments of the present disclosure.

FIG. 8 illustrates how NLU processing is performed on text data. Generally, the Natural language component 160 attempts to make a semantic interpretation of text data input thereto. That is, the natural language component 160 determines the meaning behind text data based on the individual words and/or phrases represented therein. The natural language component 160 interprets text data to derive an intent of the user as well as pieces of the text data that allow a device (e.g., a speech processing enabled device, the speech processing system 100, etc.) to complete that action.

The natural language component 160 may process text data including several ASR hypotheses. The natural language component 160 may process all (or a portion of) the ASR hypotheses input therein. Even though the ASR component 150 may output multiple ASR hypotheses, the natural language component 160 may be configured to only process with respect to the top scoring ASR hypothesis. Additionally, as described herein, the ASR component 150 may generate confidence scores associated with each hypothesis (e.g., the confidence scores described above in reference to Table 1).

The natural language component 160 may include one or more recognizers 863. Each recognizer 863 may be associated with a different skill. Each recognizer 863 may process with respect to text data input to the natural language component 160. Each recognizer 863 may operate at least partially in parallel with other recognizers 863 of the natural language component 160.

Each recognizer 863 may include a named entity recognition (NER) component 862. The NER component 862 attempts to identify grammars and lexical information that may be used to construe meaning with respect to text data input therein. The NER component 862 identifies portions of text data that correspond to a named entity that may be applicable to processing performed by a skill. The NER component 862 (or other component of the natural language component 160) may also determine whether a word refers to an entity whose identity is not explicitly mentioned in the text data, for example "him," "her," "it" or other anaphora, exophora or the like.

Each recognizer 863, and more specifically each NER component 862, may be associated with a particular grammar model and/or database, a particular set of intents/actions (e.g., in intents database 874), and a particular personalized lexicon 886. Each gazetteer 884 may include skill-indexed lexical information associated with a particular user and/or speech processing enabled device. For example, a Gazetteer A (884a) includes skill-indexed lexicon 886a to 886n. A user's music skill lexical information might include album titles, artist names, and song names, for example, whereas a user's contact list skill lexical information might include the names of contacts. Since every user's music collection and contact list is presumably different, this personalized information improves entity resolution.

An NER component 862 applies grammar models 876 and lexicon 886 to determine a mention of one or more entities in text data. In this manner, the NER component 862 identifies "slots" (corresponding to one or more particular words in text data) that may be used for later processing. The NER component 862 may also label each slot with a type (e.g., noun, place, city, artist name, song name, etc.). As previously described, each recognizer 863 may generate confidence scores associated with each named entity and/or with each match of a named entity. In at least some examples, pre-computed features generated by the ranking and arbitration component 140 may be used by the NER component 862 and/or by natural language component 160, generally, in order to generate the N-best list of intents and/or skills for processing particular request data.

Each grammar model 876 includes the names of entities (i.e., nouns) commonly found in speech about the particular skill to which the grammar model 876 relates, whereas the lexicon 886 is personalized to the user and/or a speech processing enabled device from which the user input originated. For example, a grammar model 876 associated with a shopping skill may include a database of words commonly used when people discuss shopping.

Each recognizer 863 may also include an intent classification (IC) component 864. An IC component 864 parses text data to determine an intent(s). An intent represents an action a user desires be performed. An IC component 864 may communicate with an intents database 874 of words linked to intents. For example, a music intent database may link words and phrases such as "quiet," "volume off," and "mute" to a <Mute> intent. An IC component 864 identifies potential intents by comparing words and phrases in text data to the words and phrases in an intents database 874.

The intents identifiable by a specific IC component 864 are linked to skill-specific grammar models 876 with "slots" to be filled. Each slot of a grammar model 876 corresponds to a portion of text data that the system believes corresponds to an entity. For example, a grammar model 876 corresponding to a <PlayMusic> intent may correspond to sentence structures such as "Play {Artist Name}," "Play {Album Name}," "Play {Song name}," "Play {Song name} by {Artist Name}," etc. However, to make resolution more flexible, grammar models 876 may not be structured as sentences, but rather based on associating slots with grammatical tags.

For example, an NER component 862 may parse text data to identify words as subject, object, verb, preposition, etc. based on grammar rules and/or models prior to recognizing named entities in the text data. An IC component 864 (e.g., implemented by the same recognizer 863 as the NER component 862) may use the identified verb to identify an intent. The NER component 862 may then determine a grammar model 876 associated with the identified intent. For example, a grammar model 876 for an intent corresponding to <PlayMusic> may specify a list of slots applicable to play the identified "object" and any object modifier (e.g., a prepositional phrase), such as {Artist Name}, {Album Name}, {Song name}, etc. The NER component 862 may then search corresponding fields in a lexicon 886, attempting to match words and phrases in text data the NER component 862 previously tagged as a grammatical object or object modifier with those identified in the lexicon 886.

An NER component 862 may perform semantic tagging, which is the labeling of a word or combination of words according to their type/semantic meaning. An NER component 862 may parse text data using heuristic grammar rules, or a model may be constructed using techniques such as hidden Markov models, maximum entropy models, log linear models, conditional random fields (CRF), and the like. For example, an NER component 862 implemented by a music recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 862 identifies "Play" as a verb, which an IC component 864 may determine corresponds to a <PlayMusic> intent. At this stage, no determination has been made as to the meaning of "mother's little helper" and "the rolling stones," but based on grammar rules and models, the NER component 862 has determined the text of these phrases relates to the grammatical object (i.e., entity) of the user input represented in the text data.

The models linked to the intent are then used to determine what database fields should be searched to determine the meaning of these phrases, such as searching a user's gazetteer 884 for similarity with the model slots. For example, a model for a <PlayMusic> intent might indicate to attempt to resolve the identified object based on {Artist Name}, {Album Name}, and {Song name}, and another model for the same intent might indicate to attempt to resolve the object modifier based on {Artist Name}, and resolve the object based on {Album Name} and {Song Name} linked to the identified {Artist Name}. If the search of the gazetteer 884 does not resolve a slot/field using gazetteer information, the NER component 862 may search a database of generic words (e.g., in the knowledge base 872). For example, if the text data includes "play songs by the rolling stones," after failing to determine an album name or song name called "songs" by "the rolling stones," the NER component 862 may search the database for the word "songs." In the alternative, generic words may be checked before the gazetteer information, or both may be tried, potentially producing two different results.

An NER component 862 may tag text data to attribute meaning thereto. For example, an NER component 862 may tag "play mother's little helper by the rolling stones" as: {skill} Music, {intent}<PlayMusic>, {artist name} rolling stones, {media type} SONG, and {song title} mother's little helper. For further example, the NER component 862 may tag "play songs by the rolling stones" as: {skill} Music, {intent}<PlayMusic>, {artist name} rolling stones, and {media type} SONG.

The natural language component 160 may generate cross-skill N-best list data, which may include a list of NLU hypotheses output by each recognizer 863. A recognizer 863 may output tagged text data generated by an NER component 862 and an IC component 864 operated by the recognizer 863, as described above. Each NLU hypothesis including an intent indicator and text/slots may be grouped as an NLU hypothesis represented in the cross-skill N-best list data 940. Each NLU hypothesis may also be associated with one or more respective confidence score(s) for the NLU hypothesis. For example, the cross-skill N-best list data may be represented as, with each line representing a separate NLU hypothesis:

[0.95] Intent: <PlayMusic> ArtistName: Lady Gaga SongName: Poker Face

[0.95] Intent: <PlayVideo> ArtistName: Lady Gaga VideoName: Poker Face

[0.01] Intent: <PlayMusic> ArtistName: Lady Gaga AlbumName: Poker Face

[0.01] Intent: <PlayMusic> SongName: Poker face

Ranking component 120 may assign a particular confidence score to each NLU hypothesis input therein. As previously described, machine learning models of the ranking component 120 may use precomputed features generated by ranking and arbitration component 140 as inputs along with the cross-skill N-best list data in order to generate the confidence scores for each NLU hypothesis of the cross-skill N-best list data. The confidence score of an NLU hypothesis may represent a confidence of the system in the NLU processing performed with respect to the NLU hypothesis. The confidence score of a particular NLU hypothesis may be affected by whether the NLU hypothesis has unfilled slots. For example, if an NLU hypothesis associated with a first skill includes slots that are all filled/resolved, that NLU hypothesis may be assigned a higher confidence score than another NLU hypothesis including at least some slots that are unfilled/unresolved by the entity resolution component 862.

The ranking component 120 may apply re-scoring, biasing, and/or other techniques to determine the top scoring NLU hypotheses. To do so, the ranking component 120 may consider not only the data output by the entity resolution component 862, but may also consider other data such as skill rating, popularity data, context data, and/or other features computed by ranking and arbitration component 140.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A speech processing method of routing request data, the method comprising:
  receiving feature definition data identifying source data used to generate first feature data, the first feature data comprising structured data used as input for a first machine learning model configured to rank candidate applications to process input request data;
  receiving the source data;
  generating the first feature data from the source data using the feature definition data;
  storing the first feature data in a first data structure;
  receiving, by a speech processing system, first request data representing a user request;
  determining a list of candidate applications for processing the first request data;
  sending the list of candidate applications to a ranking component comprising the first machine learning model, the first machine learning model configured to generate a first score for a first candidate application of the list of candidate applications, wherein the first score represents a likelihood that the first candidate application is appropriate to process the first request data;
  sending, by the ranking component, a request for the first feature data;
  sending the first feature data from the first data structure to the ranking component;
  inputting, by the ranking component, the first feature data and a feature representation of the list of candidate applications into the first machine learning model;
  generating, by the first machine learning model, the first score for the first candidate application; and
  selecting the first candidate application for processing the first request data.

2. The method of claim 1, further comprising:
  ranking, by the ranking component, the list of candidate applications using at least the first score for the first candidate application;
  determining a top-ranked application from the list of candidate applications;
  determining metadata associated with the top-ranked application indicating that the top-ranked application belongs to a sensitive class of applications;
  generating a confirmation request comprising a request to confirm that an action associated with the top-ranked application was an intended action; and
  outputting, by the speech processing system, an audio representation of the confirmation request.

3. The method of claim 1, further comprising:
  receiving predicate data defining a class of request data for routing to the first candidate application;
  determining that the first request data corresponds to the class of request data;
  sending first intent data associated with the first request data to the first candidate application for processing, wherein the first candidate application is operable to process the first intent data to generate first action data;
  generating feedback data to solicit user input data indicating user satisfaction with the first action data; and
  generating an updated first machine learning model using the user input data.

4. A method comprising:
  generating first data using feature data configured to generate features for input to a first machine learning model, the first data used as input to the first machine learning model, wherein the first machine learning model is configured to rank speech processing applications to process input data;
  storing the first data in non-transitory computer-readable memory;
  receiving, by a speech processing system, first input data;
  receiving the first data from the non-transitory computer-readable memory based at least in part on the first input data;

generating, by the first machine learning model, a ranked list of speech processing applications for processing the first input data using the first data; and determining, by the speech processing system, a first speech processing application for processing the first input data, wherein the first speech processing application is among the ranked list of speech processing applications.

5. The method of claim 4, further comprising generating, by the first machine learning model, the ranked list of speech processing applications based at least in part on using the first data as input into the first machine learning model, wherein the first speech processing application is a highest-ranked speech processing application among the ranked list of speech processing applications.

6. The method of claim 4, further comprising:
receiving, by the speech processing system, second input data;
determining, by a ranking component of the speech processing system, the first speech processing application to process the second input data;
determining a first class of input data that is routed to a second speech processing application for processing;
determining that the second input data corresponds to the first class of input data; and
sending the second input data to the second speech processing application for processing.

7. The method of claim 6, further comprising:
determining user feedback data related to processing of the second input data by the second speech processing application; and
generating an updated machine learning model based at least in part on the user feedback data, wherein the updated machine learning model is used to determine routing destinations for input data received by the speech processing system.

8. The method of claim 4, further comprising:
generating at least one index used to query the first data in the non-transitory computer-readable memory;
receiving, by the speech processing system, second input data;
using the at least one index to lookup the first data based at least in part on the second input data;
generating, by the first machine learning model, a second ranked list of speech processing applications to process the second input data using the first data; and
determining, by the speech processing system, a second speech processing application to process the second input data based at least in part on the first data, wherein the second speech processing application is among the ranked list of speech processing applications.

9. The method of claim 4, further comprising:
determining metadata associated with the first speech processing application indicating that the first speech processing application belongs to a first class of speech processing applications;
generating request data to confirm that an action associated with the first speech processing application is intended; and
outputting, by the speech processing system, an audio representation of the request data.

10. The method of claim 9, further comprising delaying execution of the action until confirmation data is received indicating that the action associated with the first speech processing application is intended.

11. The method of claim 4, further comprising:
determining, by the speech processing system, a second speech processing application to process the first input data based at least in part on the first data;
generating, by the speech processing system, a disambiguation request used to disambiguate between the first speech processing application and the second speech processing application to process the first input data;
receiving second data comprising a response to the disambiguation request indicating that the first speech processing application is to process the first input data; and
processing, by the first speech processing application, the first input data to generate first action data.

12. The method of claim 4, the method further comprising:
generating second data used as second input to the first machine learning model;
storing the second data in the non-transitory computer-readable memory;
generating third data used as input to a second machine learning model;
storing the second data in the non-transitory computer-readable memory;
receiving, by the speech processing system, second input data; and
receiving the first data, the second data, and the third data from the non-transitory computer-readable memory based at least in part on the receiving the second input data.

13. A computing device comprising:
at least one processor; and
at least one non-transitory computer-readable memory storing instructions that, when executed by the at least one processor, are effective to program the at least one processor to:
generate first data using feature data configured to generate features for input to a first machine learning model, the first data used as input to the first machine learning model, wherein the first machine learning model is configured to rank speech processing applications to process input data;
store the first data in non-transitory computer-readable memory;
receive, by a speech processing system, first input data;
receive the first data from the non-transitory computer-readable memory based at least in part on the first input data;
generate, by the first machine learning model, a ranked list of speech processing applications for processing the first input data using the first data; and
determine, by the speech processing system, a first speech processing application for processing the first input data, wherein the first speech processing application is among the ranked list of speech processing applications.

14. The computing device of claim 13, wherein the at least one non-transitory computer-readable memory stores further instructions that, when executed by the at least one processor, are further effective to program the at least one processor to:
generate, by the first machine learning model, the ranked list of speech processing applications based at least in part on using the first data as input into the first machine learning model, wherein the first speech processing application is a highest-ranked speech processing application among the ranked list of speech processing applications.

15. The computing device of claim 13, wherein the at least one non-transitory computer-readable memory stores further instructions that, when executed by the at least one processor, are further effective to program the at least one processor to:
   receive, by the speech processing system, second input data;
   determine, by a ranking component of the speech processing system, the first speech processing application to process the second input data;
   determine a first class of input data that is routed to a second speech processing application for processing;
   determine that the second input data corresponds to the first class of input data; and
   send the second input data to the second speech processing application for processing.

16. The computing device of claim 15, wherein the at least one non-transitory computer-readable memory stores further instructions that, when executed by the at least one processor, are further effective to program the at least one processor to:
   determine user feedback data related to processing of the second input data by the second speech processing application; and
   generate an updated machine learning model based at least in part on the user feedback data, wherein the updated machine learning model is used to determine routing destinations for input data received by the speech processing system.

17. The computing device of claim 13, wherein the at least one non-transitory computer-readable memory stores further instructions that, when executed by the at least one processor, are further effective to program the at least one processor to:
   generate at least one index used to query the first data in the non-transitory computer-readable memory;
   receive, by the speech processing system, second input data;
   use the at least one index to lookup the first data based at least in part on the second input data;
   generate, by the first machine learning model, a second ranked list of speech processing applications to process the second input data using the first data; and
   determine, by the speech processing system, a second speech processing application to process the second input data based at least in part on the first data, wherein the second speech processing application is among the ranked list of speech processing applications.

18. The computing device of claim 13, wherein the at least one non-transitory computer-readable memory stores further instructions that, when executed by the at least one processor, are further effective to program the at least one processor to:
   determine metadata associated with the first speech processing application indicating that the first speech processing application belongs to a first class of speech processing applications;
   generate request data to confirm that an action associated with the first speech processing application is intended; and
   output, by the speech processing system, an audio representation of the request data.

19. The computing device of claim 13, wherein the at least one non-transitory computer-readable memory stores further instructions that, when executed by the at least one processor, are further effective to program the at least one processor to:
   determine, by the speech processing system, a second speech processing application to process the first input data based at least in part on the first data;
   generate, by the speech processing system, a disambiguation request used to disambiguate between the first speech processing application and the second speech processing application to process the first input data;
   receive second data comprising a response to the disambiguation request indicating that the first speech processing application is to process the first input data; and
   process, by the first speech processing application, the first input data to generate first action data.

20. The computing device of claim 13, wherein the at least one non-transitory computer-readable memory stores further instructions that, when executed by the at least one processor, are further effective to program the at least one processor to:
   generate second data used as second input to the first machine learning model;
   store the second data in the non-transitory computer-readable memory;
   generate third data used as input to a second machine learning model;
   store the second data in the non-transitory computer-readable memory;
   receive, by the speech processing system, second input data; and
   receive the first data, the second data, and the third data from the non-transitory computer-readable memory based at least in part on the receiving the second input data.

* * * * *